United States Patent
Lyu

(10) Patent No.: US 11,810,336 B2
(45) Date of Patent: Nov. 7, 2023

(54) OBJECT DISPLAY METHOD AND APPARATUS, ELECTRONIC DEVICE, AND COMPUTER READABLE STORAGE MEDIUM

(71) Applicant: BEIJING BYTEDANCE NETWORK TECHNOLOGY CO., LTD., Beijing (CN)

(72) Inventor: Shaohui Lyu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/720,232

(22) Filed: Apr. 13, 2022

(65) Prior Publication Data

US 2022/0245920 A1 Aug. 4, 2022

Related U.S. Application Data

(63) Continuation of application No. PCT/CN2020/106818, filed on Aug. 4, 2020.

(30) Foreign Application Priority Data

Oct. 14, 2019 (CN) .......................... 201910974919.3

(51) Int. Cl.
*G06V 10/20* (2022.01)
*G06V 20/40* (2022.01)
(Continued)

(52) U.S. Cl.
CPC .......... *G06V 10/255* (2022.01); *G06V 10/245* (2022.01); *G06V 20/41* (2022.01); *H04N 5/2621* (2013.01); *G06V 2201/07* (2022.01)

(58) Field of Classification Search
CPC .... G06V 10/255; G06V 20/41; G06V 10/245; G06V 2201/07; H04N 5/2621
See application file for complete search history.

(56) References Cited

U.S. PATENT DOCUMENTS 8,130,244 B2 * 3/2012 Cooper .................. G06T 15/60
345/619
10,152,630 B2 * 12/2018 Chen ....................... G06T 7/194
(Continued)

FOREIGN PATENT DOCUMENTS

CN 101477690 B 4/2011
CN 105335064 A 2/2016
(Continued)

OTHER PUBLICATIONS

International Patent Application No. PCT/CN2020/106818; Int'; Written Opinion and Search Report; dated Nov. 10, 2020; 7 pages.
(Continued)

*Primary Examiner* — Kenny A Cese
(74) *Attorney, Agent, or Firm* — BakerHostetler

(57) ABSTRACT

An object display method, an object display apparatus, an electronic device, and a computer readable storage medium are provided. The object display method comprises: receiving video images; recognizing a target object in the video image; displaying, in response to a first target object being recognized, a first object having a first shape at a first location in the video images; displaying, in response to a second target object being recognized, a second object having a second shape at a second location in the video images; and combining, when a distance between the first target object and the second target object is less than a first threshold, the first object and the second object so that the first object and the second object form a third shape.

13 Claims, 4 Drawing Sheets

(51) Int. Cl.
*G06V 10/24* (2022.01)
*H04N 5/262* (2006.01)

(56) References Cited

U.S. PATENT DOCUMENTS

| | | | |
|---|---|---|---|
| 10,510,152 B2* | 12/2019 | Romanik | G06V 10/462 |
| 10,719,121 B2* | 7/2020 | Kimura | G06F 3/013 |
| 2011/0234838 A1 | 9/2011 | Naganuma et al. | |
| 2012/0143808 A1* | 6/2012 | Karins | G06N 7/005 |
| | | | 706/46 |
| 2015/0371447 A1 | 12/2015 | Yasutake | |
| 2016/0260222 A1* | 9/2016 | Paglieroni | G01S 7/411 |
| 2018/0046858 A1* | 2/2018 | Chen | G06V 20/52 |
| 2018/0254065 A1* | 9/2018 | Chen | G06T 7/74 |

FOREIGN PATENT DOCUMENTS

| | | |
|---|---|---|
| CN | 107633526 A | 1/2018 |
| CN | 107993191 A | 5/2018 |
| CN | 108289180 A | 7/2018 |
| CN | 108958610 A | 12/2018 |
| CN | 109068053 A | 12/2018 |
| CN | 109391792 A | 2/2019 |
| CN | 110058685 A | 7/2019 |
| CN | 110062176 A | 7/2019 |
| CN | 110213638 A | 9/2019 |
| CN | 110321865 A | 10/2019 |
| CN | 110807728 A | 2/2020 |
| JP | 2005-107848 A | 4/2005 |
| JP | 2006-048415 A | 2/2006 |
| JP | 2012-034242 A | 2/2012 |
| JP | 2013-247457 A | 12/2013 |
| WO | WO 2017/013936 A1 | 1/2017 |
| WO | WO 2019/024750 A1 | 2/2019 |

OTHER PUBLICATIONS

"Douyin is like love, how to shoot Douyin close to a little special effects tutorial"; https//jingyan.baidu.com/article/ad310e8006b33f1849f49eb1.html; Baidu; Feb. 2019; accessed Apr. 2022; 6 pages.

"That's How You Couples Make Heart Shape with Arms . . . "; https://www.iqiyi.com/video/error.html?errortype=5; iQiyi; © 2022; accessed Apr. 18, 2018; one page.

"Application of digital video special effects design and animation synthesis method"; Computer CD Software and Applications; Nov. 2014; p. 221 and 223 (contains English Abstract).

"Research on key technologies of image and video special effects editing"; Science & Technology Information; No. 5; Feb. 2018; p. 33-34 (contains English Abstract).

"Research on the application of digital special effects in film and television animation production"; Digitization User; Jul. 2019; p. 281 (contains English Abstract).

Zhao et al.; "An Augmented reality method with image composition and image special effects"; 8$^{th}$ Int'l Congress on Image and Signal Processing; 2015; p. 866-870.

Qiong Wang; "Design of 3D Animation Special Effects in Animation 3D Modeling Teaching Based on QFD Theory"; Int'l Journal of Emerging Technologies in Learning; vol. 12 No. 7; 2017; p. 90-100.

Theresa; https://v.douyin.com/d6Xq2Mf/; Feb. 2019; accessed Apr. 15, 2022; 9 pages.

Ni Feng et al.; "A Rapid Algorithm for Content-Based Moving Objects Segmentation in Video Sequence"; China Academic Journal Electronic Publishing House; Microelectronics and Computers; Dec. 2007; p. 40-43 (contains English Abstract).

* cited by examiner

OBJECT DISPLAY METHOD AND APPARATUS, ELECTRONIC DEVICE, AND COMPUTER READABLE STORAGE MEDIUM

REFERENCE TO RELATED APPLICATION

This application is a continuation of International Patent Application No. PCT/CN2020/106818, titled "OBJECT DISPLAY METHOD AND APPARATUS, ELECTRONIC DEVICE, AND COMPUTER READABLE STORAGE MEDIUM", filed on Aug. 4, 2020, which claims priority to Chinese Patent Application No. 201910974919.3, titled "OBJECT DISPLAY METHOD AND APPARATUS, ELECTRONIC DEVICE, AND COMPUTER READABLE STORAGE MEDIUM", filed on Oct. 14, 2019, both of which are incorporated herein by reference in their entireties.

FIELD

The present disclosure relates to the field of image processing, and in particular to an object display method, an object display apparatus, an electronic device and a computer readable storage medium.

BACKGROUND

With the development of computer networks and the popularization of smart phones, users can no longer be satisfied with expressing their emotions simply by pictures and words. Videos become more favorable because of their diversity in contents and forms which bring intuitive feeling for users. More and more ordinary users create original videos. However, on one hand, the expression of original videos captured by ordinary users is unexciting. On the other hand, more and more video special effects are used in film and television works, which bring more diversity in expression. The video special effects can support and guarantee a successful film or television work.

However, the current video special effects are generally made by means of post-production on recorded videos. The special effects are displayed in a fixed manner, which can only be played to the end according to the pre-determined time logic. In addition, the post-production is difficult, so that ordinary users can neither quickly generate special effects nor produce complicated special effects. Therefore, it is desired to solve the technical problem of how to generate video effects simply and quickly.

SUMMARY

This summary is provided to introduce the idea in a simplified form. The idea will be described in detail in the following description. This summary is neither intended to identify key features or essential features of the claimed technical solution, nor intended to be used to limit the scope of the claimed technical solution.

In a first aspect, an object display method is provided according to embodiments of the present disclosure, including:
receiving video images;
recognizing target objects in the video images;
displaying, in response to a first target object being recognized, a first object having a first shape at a first location in the video images;
displaying, in response to a second target object being recognized, a second object having a second shape at a second location in the video images; and
combining, when a distance between the first target object and the second target object is less than a first threshold, the first object and the second object so that the first object and the second object form a third shape, where the third shape is formed by combining the first shape and the second shape.

In a second aspect, an object display apparatus is provided according to embodiments of the present disclosure, including:
an image receiving module, configured to receive video images;
a target object recognition module, configured to recognize target objects in the video images;
a first object display module, configured to display, in response to a first target object being recognized, a first object having a first shape at a first location in the video images;
a second object display module, configured to display, in response to a second target object being recognized, a second object having a second shape at a second location in the video images; and
a combining module, configured to combine, when a distance between the first target object and the second target object is less than a first threshold, the first object and the second object so that the first object and the second object form a third shape, where the third shape is formed by combining the first shape and the second shape.

In a third aspect, an electronic device is provided according to embodiments of the present disclosure, including:
at least one processor, and
a memory in communication connection with the at least one processor, where the memory stores instructions executable by the at least one processor, and the instructions, when being executed by the at least one processor, cause the at least one processor to perform any object display method according to the above first aspect.

In a fourth aspect, non-transitory computer-readable storage medium is provided according to embodiments of the present disclosure, storing computer instructions, where the computer instructions, when being executed by a computer, cause the computer to perform any object display method according to the above first aspect.

The present disclosure provides an object display method, an object display apparatus, an electronic device, and computer-readable storage medium. The object display method includes: receiving video images, the video images including multiple image frames; recognizing target objects in the image frames of the video images; displaying, in response to a first target object being recognized, a first object having a first shape at a first location in the video images; displaying, in response to a second target object being recognized, a second object having a second shape at a second location in the video images; and combining, when a distance between the first target object and the second target object is less than a first threshold, the first object and the second object so that the first object and the second object form a third shape. By the above method, the technical problem in the conventional technology that the video effect cannot be generated simply and quickly is solved.

The above description is only an overview of the technical solutions of the present disclosure. For better understanding of the technical solutions of the present disclosure and implementing the technical solutions according to the specification, and to make the above and other objectives, features and advantages of the technical solutions in the present disclosure clearer, the detailed description is provided below with reference to preferred embodiments and the accompanying drawings.

BRIEF DESCRIPTION OF THE DRAWINGS

The above and other features, advantages and aspects of various embodiments of the present disclosure will become more clear when taken in conjunction with the accompanying drawings and with reference to the following detailed description. Throughout the drawings, the same or similar reference numbers refer to the same or similar elements. It should be understood that the drawings are schematic and that the units and elements are not necessarily drawn to scale.

DETAILED DESCRIPTION

Figure 1:
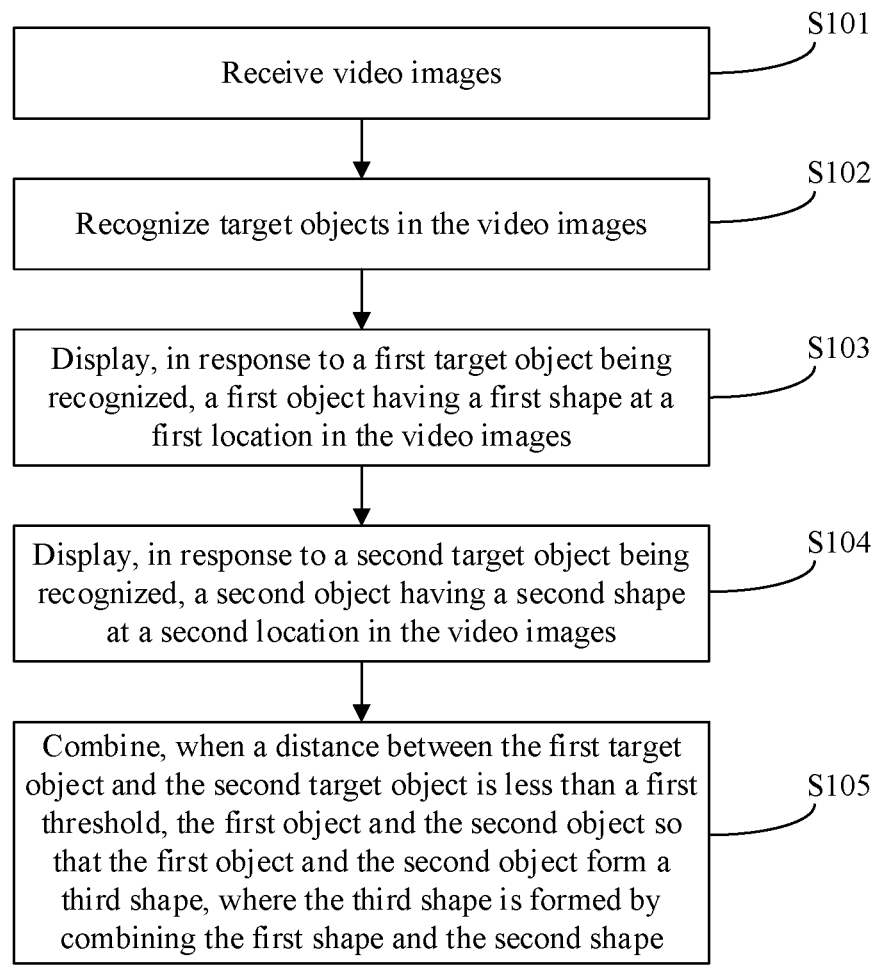
FIG. 1 is a flowchart of an object display method according to an embodiment of the present disclosure.

Embodiments of the present disclosure will be described in more detail below with reference to the accompanying drawings. While certain embodiments of the present disclosure are shown in the drawings, it should be understood that the present disclosure may be embodied in various forms and should not be construed as being limited to the embodiments set forth herein. The embodiments are provided for a more thorough and complete understanding. It should be understood that the drawings and embodiments of the present disclosure are only provided as examples, and are not intended to limit the protection scope of the present disclosure.

It should be understood that the various steps described in the method embodiments of the present disclosure may be performed in different orders and/or in parallel. Furthermore, method embodiments may include additional steps and/or omit an illustrated step. The scope of the present disclosure is not limited in this regard.

As used herein, the terms "including" and "comprising" and variations thereof are non-exclusive, i.e., meaning "including but not limited to". The term "based on" means "at least partially based on". The term "an embodiment" means "at least one embodiment", the term "another embodiment" means "at least one another embodiment", and the term "some embodiments" means "at least some embodiments". Relevant definitions of other terms will be given in the description below.

It should be noted that concepts such as "first" and "second" mentioned in the present disclosure are only used to distinguish different devices, modules or units, and are not used to limit the order or interdependence of functions performed by these devices, modules or units.

It should be noted that the modifications of "a" and "a plurality" mentioned in the present disclosure are illustrative rather than restrictive, and those skilled in the art should understand that unless clearly indicated otherwise, they should be understood as "one or more".

The names of messages or information exchanged between multiple devices in the embodiments of the present disclosure are only for illustrative purposes, and are not intended to limit the scope of these messages or information.

FIG. 1 is a flowchart of an object display method according to an embodiment of the present disclosure. The object display method provided in this embodiment may be executed by an object display apparatus. The object display apparatus may be implemented as software, or implemented as a combination of software and hardware. The object display apparatus may be integrated in a device of an object display system, such as an object display server or an object display terminal device. As shown in FIG. 1, the method includes the following steps S101 to S105.

In step S101, video images are received.

Optionally, in this step, the receiving video images is receiving video images from an image sensor. The image sensor refers to various devices that capable of collecting images. Typical image sensors are cameras and the like. In this embodiment, the image sensor may be a camera on a terminal device, such as a front or rear camera on a smartphone. The images collected by the camera may be directly displayed on the display screen of the phone. In this step, the video images captured by the image sensor are received and displayed as background images of an object.

Optionally, in this step, the receiving video images is receiving a video image file from a memory. The video image file is a video recorded in advance and stored in the memory. Optionally, the storage is a local storage or a network storage. In this step, the video image file sent from the memory is received and displayed on the display device of the device as background images of an object.

In this step, the video images may include a human face. Optionally, at least one frame of multiple image frames of the video images includes a human face. Typically, the user turns on a camera of a mobile terminal device to take a video of himself, and the video images obtained by the camera includes face images of the user. Alternatively, an image of a human face is recorded in the video images file.

In step S102, target objects are recognized in the video images.

The target objects may be any preset object that is required to be recognized from the video images. A typical target object may be a human face.

Any object recognition algorithm can be used to recognize the target objects in the video images. Typically, methods based on deep learning are used. For example, the target object is a human face, and a neural network is trained using images with human faces. The trained neural network is used to classify each image frame in the video images to determine whether the image frame contains a human face. If it is determined that an image frame contains a human face, a face detection algorithm is used to detect key points of the human face to determine the location of the human face. Alternatively, a neural network is trained using images marked with face circumscribed rectangles. The trained neural network is used to perform circumscribed rectangle regression on each image frame in the video images to reduce the range of the face, and then the face detection algorithm is used to detect the key points of the face to determine the location of the face. Alternatively, a neural network is trained by using images marked with face key points, and the trained neural network is used to perform face key point regression on each image frame in the video images to determine whether the image frame contains a human face and determine locations of the key points of the face.

It can be understood that the above-mentioned face recognition methods are only examples and do not limit the present disclosure. In fact, the target object and the appropriate recognition algorithm for the target object may be selected according to the scenarios and the effect to be achieved.

In step S103, in response to a first target object being recognized, a first object having a first shape is displayed at a first location in the video images.

The object is a virtual material, which is displayed in actual video images. A typical virtual material may be a sticker, and the sticker may be a static sticker or a sticker of a sequence of frames.

In this step, when the first target object is recognized from the video images, a first object corresponding to the first target object is acquired, and the first object is displayed at a first location in the video images. The first object has a first shape. Optionally, the correspondence between the target object and the object is preset. When the target object appears in the video image, the object corresponding to the target object is obtained according to the correspondence. The correspondence may be stored in a configuration file. The target object to be recognized, the type of the object, and the correspondence between the target object and the object may be configured in the configuration file.

Figure 2:
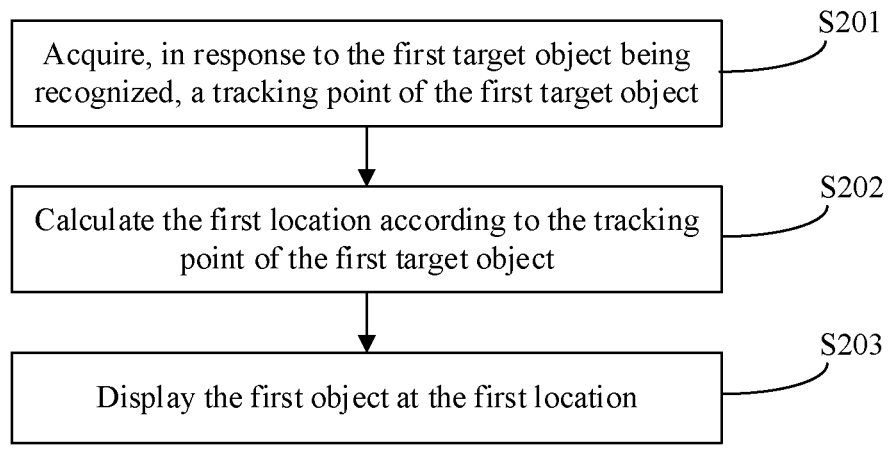
FIG. 2 is a flowchart of step S103 of an object display method according to an embodiment of the present disclosure.

As shown in FIG. 2, in this step, the displaying the first object having the first shape at the first location in the video images in response to the first target object being recognized includes steps S201 to S203.

In step S201, in response to the first target object being recognized, a tracking point of the first target object is acquired.

In step S202, the first location is calculated according to the tracking point of the first target object.

In step S203, the first object is displayed at the first location.

In the above steps, when the first target object is recognized, key points of the first target object are also detected, for details of which, one may refer to the description in step S102. One or more of the key points are preset as the tracking point of the first target object, or the tracking point is determined according to one or more of the key points. The tracking points are used to determine the display location of the first object. In step S202, the first location is calculated according to the tracking point of the first target object. Optionally, the first target object is a human face. Optionally, the tracking point is a point on a line extending from a line connecting a key point of the nose tip on the face and a key point on the edge, which is located outside the face area. An extending proportion is preset to be used to calculate a length extended outward from the key point on the edge along the connecting line, so as to obtain the tracking point. In step S203, a specific point of the first object is controlled to be coincident with the tracking point, so as to display the first object on the first location. Optionally, the specific point of the first object is the center point of the first object, and the location of the center point is set at the location of the tracking point, so as to display the first object at the first location. Thus, when the location of the first target object changes in different image frames, the location of the first object also changes accordingly, so as to achieve the effect that the first object moves with the target object.

Optionally, the acquiring the tracking point of the first target object in response to the first target object being recognized includes: determining, in response to the first target object being recognized, a location of the first target object in the video images; and acquiring the tracking point of the first target object according to the location of the first target object in the video images. In this embodiment, when the first target object is recognized, the location of the first target object in the video image is firstly determined. Optionally, it is determined that the first target object is on the left or right of the video image. The tracking point of the first target object is acquired according to the location of the first target object. Optionally, the first target object is a human face. When it is determined that the first target object is located on the left of the video image, a key point on the right edge of the human face and a key point of the nose tip on the human face in the video image are obtained, so that the tracking point is located on the right of the face (in the perspective of viewing). Similarly, when it is determined that the first target object is on the right of the video image, a key point on the left edge of the human face and a key point of the nose tip on the human face in the video image are obtained, so that the tracking point is located on the left of the face.

In the present disclosure, the first object has a first shape. Optionally, the first shape is a part of a complete shape. For example, the first shape may be a part of a circle, a part of a heart shape, a part of a rectangle, or the like. The first shape may also be a part of a complete irregular shape, such as a part of a cloud shape, a part of a mountain shape and the like.

It can be understood that the above-mentioned selection of target objects and key points and calculation of tracking points are all examples, and do not constitute any limitation to the present disclosure. In fact, any target objects, any key points and any method of calculating tracking points can be applied to the technical solution of the present disclosure.

In step S104, in response to a second target object being recognized, a second object having a second shape is displayed at a second location in the video images.

Optionally, the displaying the second object at the second location in the video images in response to the second target object being recognized includes: acquiring, in response to the second target object being recognized, a tracking point of the second target object; calculating the second location according to the tracking point of the second target object; and displaying the second object at the second location.

Optionally, the acquiring, in response to the second target object being recognized, a tracking point of the second target object includes: determining, in response to the second target object being recognized, a location of the second target object in the video images; and acquiring the tracking point of the second target object according to the location of the second target object in the video images.

Optionally, the second shape and the first shape are complementary shapes. For example, the first shape is a half of a heart shape, and the second shape is the other half of the heart shape.

The specific implementation of the above-mentioned optional steps may be the same as the optional steps performed for the first target object and the first object in the step S103, details of which are not repeated here.

In step S105, when a distance between the first target object and the second target object is less than a first threshold, the first object and the second object are combined so that the first object and the second object form a third shape.

Optionally, the determining that the distance between the first target object and the second target object is less than the first threshold includes: obtaining a first anchor point of the first target object; obtaining a second anchor point of the second target object; calculating a first distance between the first anchor point and the second anchor point; and determining, when the first distance is less than the first threshold, that the distance between the first target object and the second target object is less than the first threshold. Optionally, the anchor point may be a key point of the target object or a point calculated based on the key point of the target object. Typically, the anchor point is a key point of the nose tip of a human face, or the anchor point is the midpoint of a triangle formed by the key points of the eyes and the key point of the nose tip on the face. After the anchor points is obtained, the coordinates of the anchor points are obtained, and the first distance is calculated according to the coordinates of the first anchor point and the coordinates of the second anchor point. The first distance represents the distance between the first target object and the first target object. If the first distance is less than the preset first threshold, the distance between the first target object and the second target object is smaller than the first threshold.

Optionally, the combining the first object and the second object so that the first object and the second object form a third shape includes: combining the first shape of the first object with the second shape of the second objects according to a complementary relation to form a third shape. Typically, the first shape and the second shape may be complementary half heart shapes. When it is determined that the distance between the first target object and the second target object is less than the first threshold, the two complementary half hearts are combined along their complementary edges to form a complete heart shape.

By the technical solutions described in the above steps, two objects may be combined according to a calculated distance between two target objects in the image, without requiring to record the video and add a special effect in the video in advance, In this way, the special effect can be rendered in real time in any video images.

Figure 3:
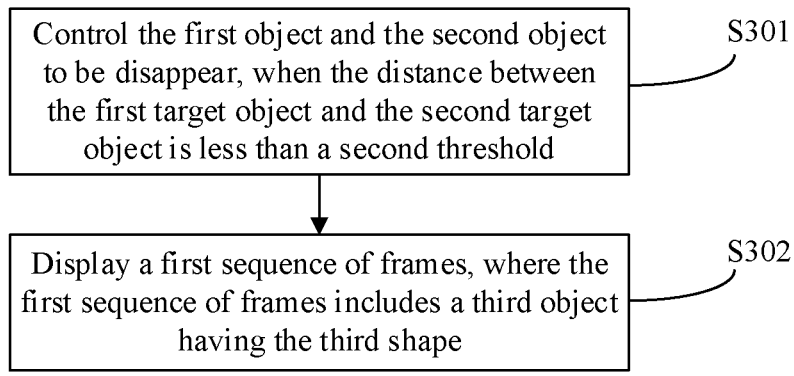
FIG. 3 is a flowchart of a further object display method according to an embodiment of the present disclosure.

Further, as shown in FIG. 3, after the step S105, the method further includes the following steps S301 and S302.

In step S301, the first object and the second object are controlled to be disappear, when the distance between the first target object and the second target object is less than a second threshold.

In step S302, a first sequence of frames is displayed, where the first sequence of frames includes a third object having the third shape.

In step S301, the first distance between the first anchor point and the second anchor point may be calculated continuously by the method in step S105. When the first distance is less than the second threshold, it is determined that the distance between the first target object and the second target object is less than the second threshold. At this time, the first object and the second object are controlled to be disappear in the video images, which may be implemented by not rendering the first object and the second object anymore, or by setting the transparency of the first object and the second object to 1 to make them invisible.

In step S302, the first sequence of frames is acquired and displayed at the location where the first object and the second object disappear. The first sequence of frames includes the third object having the third shape. Specifically, the first sequence of frames includes the third object, and each frame of the first sequence of frames represents a state change of the third object. Typically, the third object is a virtual heart, and the first sequence of frames presents the dynamic change of the virtual heart, such as gradually growing larger, changing from white to red, and the like. In other words, the first sequence of frames presents the changing state of the third object obtained by combining the first object and the second object.

Figure 4:
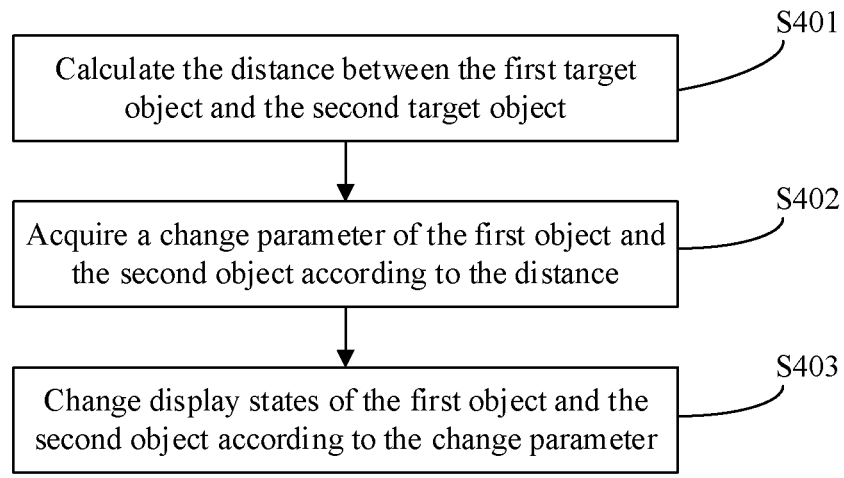
FIG. 4 is a flowchart of an example of changing object states in an object display method according to an embodiment of the present disclosure.

Further, as shown in FIG. 4, after the step S104, the method may further include the following steps S401 to S403.

In step S401, the distance between the first target object and the second target object is calculated.

In step S402, a change parameter of the first object and the second object is acquired according to the distance.

In step S403, display states of the first object and the second object are changed according to the change parameter.

In step S401, the distance between the first target object and the second target object may be calculated by the method in step S105, which will not be repeated here.

In step S402, the change parameter is obtained. The change parameter is related to the distance, the correspondence between the change parameter and the distance may be preset. For example, a first value of the distance corresponds to a first color value, and a second value of the distance corresponds to a second color value, whereby controlling the color change of the objects according to the distance.

In step S403, the display states of the first object and the second object are changed according to the change parameter. Typically, the change parameter is used to determine the color of the first object and the second object. The color of the first object and the second object is changed according to the change parameter.

In the above steps, the display states of the objects are changed according to the distance between the two target objects. Typically, the first target object and the second target object are human faces, and the first object and the second object are two complementary half hearts. When the two human faces are approaching each other, the color of the objects is changed according to the distance, for example, from light red to dark red. The color becomes darker as the distance becomes shorter. In this way, the color corresponds to the distance between the faces, so that the image can be rendered in real time without requiring to make different forms for the object in multiple frames of recorded video images.

The present disclosure provides an object display method, an object display apparatus, an electronic device, and computer-readable storage medium. The object display method includes: receiving video images, the video images including multiple image frames; recognizing target objects in the image frames of the video images; displaying, in response to a first target object being recognized, a first object having a first shape at a first location in the video images; displaying, in response to a second target object being recognized, a second object having a second shape at a second location in the video images; and combining, when a distance between the first target object and the second target object is less than a first threshold, the first object and the second object so that the first object and the second object form a third shape. By the above method, the technical problem in the conventional technology that the video effect cannot be generated simply and quickly is solved.

In the above, although the steps in the above method embodiments are described in the above order, it should be understood by those skilled in the art that the steps in the embodiments of the present disclosure are not necessarily executed in the above order, and may be performed in a reverse order, in parallel, in interleaved or in other orders. On the basis of the above steps, those skilled in the art may also add other steps. These obvious modifications or equivalents should also fall in the protection scope of the present disclosure.

Figure 5:
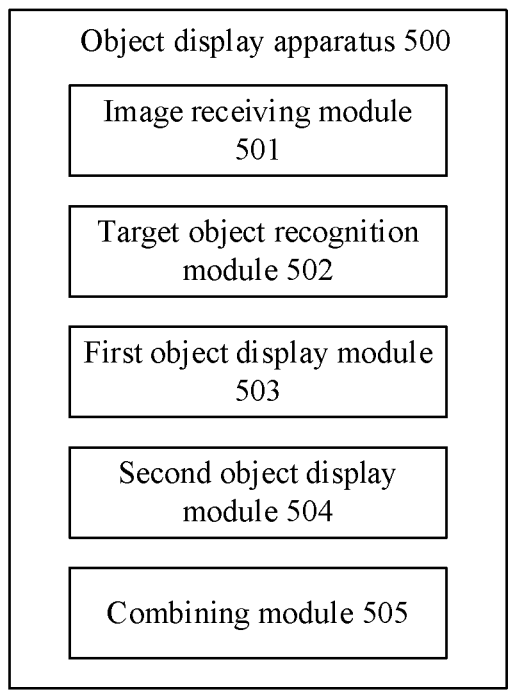
FIG. 5 is a schematic structural diagram of an object display apparatus according to an embodiment of the present disclosure.

FIG. 5 is a schematic structural diagram of an object display apparatus according to an embodiment of the present disclosure. As shown in FIG. 5, the apparatus 500 includes: an image receiving module 501, a target object recognition module 502, a first object display module 503, a second object display module 504 and a combining module 505.

The image receiving module 501 is configured to receive video images.

The target object recognition module 502 is configured to recognize target objects in the video images.

The first object display module 503 is configured to display, in response to a first target object being recognized, a first object having a first shape at a first location in the video images.

The second object display module 504 is configured to display, in response to a second target object being recognized, a second object having a second shape at a second location in the video images.

The combining module 505 is configured to combine, when a distance between the first target object and the second target object is less than a first threshold, the first object and the second object so that the first object and the second object form a third shape, where the third shape is formed by combining the first shape and the second shape.

Further, the object display device 500 further includes:
a disappear control module, configured to control the first object and the second object to be disappear when the distance between the first target object and the second target object is less than a second threshold; and
a sequence frame display module, configured to display a first sequence frame, where the first sequence frame includes a third object having the third shape.

Further, the first object display module 503 includes:
a first tracking point acquiring module, configured to acquire, in response to the first target object being recognized, a tracking point of the first target object;
a first location calculation module, configured to calculate the first location according to the tracking point of the first target object; and
a first object display sub-module, configured to display the first object at the first location.

Further, the first tracking point acquiring module includes:
a first target object location determining module, configured to determine, in response to the first target object being recognized, a location of the first target object in the video images; and
a first tracking point acquiring sub-module, configured to acquire the tracking point of the first target object according to the location of the first target object in the video images.

Further, the second object display module 504 includes:
a second tracking point acquiring module, configured to acquire, in response to the second target object being recognized, a tracking point of the second target object;
a second location calculation module, configured to calculate the second location according to the tracking point of the second target object; and
a second object display sub-module, configured to display the second object at the second location.

Further, the second tracking point acquiring module includes:
a second target object location determining module, configured to determine, in response to the second target object being recognized, a location of the second target object in the video images; and
a second tracking point acquiring sub-module, configured to acquire the tracking point of the second target object according to the location of the second target object in the video images.

Further, the object display device 500 further includes:
a distance calculation module, configured to calculate the distance between the first target object and the second target object;
a change parameter acquisition module, configured to acquire a change parameter of the first object and the second object according to the distance; and
a display state changing module, configured to change display states of the first object and the second object according to the change parameter.

The apparatus shown in FIG. 5 may execute the methods of the embodiments shown in FIG. 1 to FIG. 4. For the parts not described in detail in this embodiment, reference may be made to the related description of the embodiments shown in FIG. 1 to FIG. 4. For the process and technical effects of this technical solution, one may refer to the description of the embodiments shown in FIG. 1 to FIG. 4, which will not be repeated here.

Figure 6:
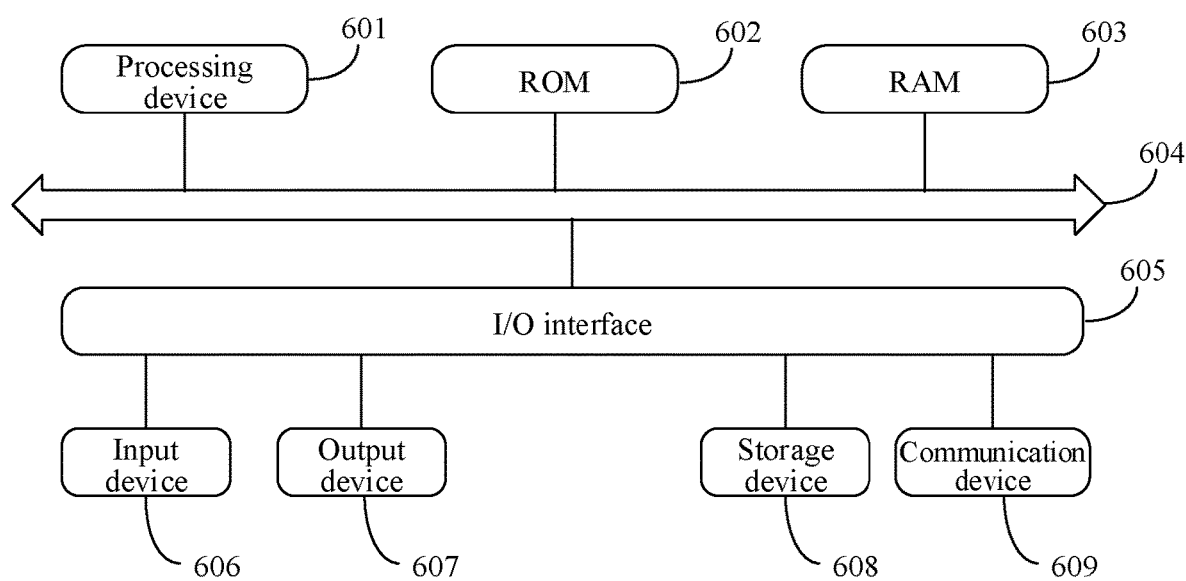
FIG. 6 is a schematic structural diagram of an electronic device according to an embodiment of the present disclosure.

FIG. 6 shows a schematic structural diagram of an electronic device 600 suitable for implementing the embodiments of the present disclosure. Terminal devices in the embodiments of the present disclosure may include, but are not limited to, mobile terminals, such as mobile phones, notebook computers, digital broadcast receivers, PDAs (Personal Digital Assistants), PADs (Tablet computers), PMPs (Portable Multimedia Players), vehicle-mounted terminals (such as in-vehicle navigation terminals), and the like, and fixed terminals such as digital TVs, desktop computers, and the like. The electronic device shown in Figure t is only an example, and should not impose any limitation on the functions and applications of the embodiments of the present disclosure.

As shown in FIG. 6, the electronic device 600 may include a processing device (such as a central processing unit, a graphics processor) 601 that may execute various appropriate actions and processes according to a program stored in a read only memory (ROM) 602 or loaded into random access memory (RAM) 603 from a storage device 608. In the RAM 603, various programs and data necessary for the operation of the electronic device 400 are also stored. The processing device 601, the ROM 602, and the RAM 603 are connected to each other through a bus 604. An input/output (I/O) interface 605 is also connected to the bus 604.

Normally, the following devices may be connected to the I/O interface 605: an input device 406 such as a touch screen, a touchpad, a keyboard, a mouse, a camera, a microphone, an accelerometer, a gyroscope and the like; an output device 607, such as a liquid crystal display (LCD), a speaker, a vibrator and the like; a storage device 608, such as a magnetic tape, a hard disk and the like; and a communication device 609. The communication device 609 may enable the electronic device 600 to communicate in a wireless or wired manner with other devices to exchange data. Although FIG. 6 shows the electronic device 600 having various means, it should be understood that not all of the illustrated means are required to be implemented or provided. More or fewer devices may alternatively be implemented or provided.

In particular, according to embodiments of the present disclosure, the processes described above with reference to the flowcharts may be implemented as computer software programs. For example, embodiments of the present disclosure include a computer program product including a computer program carried on a non-transitory computer readable medium. The computer program includes program code for performing the method illustrated in the flowchart. In such an embodiment, the computer program may be downloaded and installed from the network via the communication device 609, or from the storage device 608, or from the ROM 602. When the computer program is executed by the processing device 601, the above-mentioned functions in the methods of the embodiments of the present disclosure are executed.

It should be noted that the computer-readable medium mentioned above in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, apparatus or device, or any combination thereof. More specific examples of computer readable storage media may include, but are not limited to, electrical connections with one or more wires, portable computer disks, hard disks, a random access memory (RAM), a read only memory (ROM), an erasable Programmable read only memory (EPROM or flash memory), a optical fiber, a portable compact disk read only memory (CD-ROM), optical storage devices, magnetic storage devices, or any suitable combination thereof. In this disclosure, a computer-readable storage medium may be any tangible medium that contains or stores a program that can be used by or in conjunction with an instruction execution system, apparatus or device. In the present disclosure, a computer-readable signal medium may include a data signal propagated in baseband or as part of a carrier wave with computer-readable program code embodied thereon. Such propagated data signals may be in a variety of forms, including but not limited to electromagnetic signals, optical signals, or any suitable combination thereof. A computer-readable signal medium can also be any computer-readable medium other than a computer-readable storage medium that can transmit, propagate, or transport the program for use by or in connection with the instruction execution system, apparatus or device. Program code stored on a computer readable medium may be transmitted using any suitable medium including, but not limited to, an electrical wire, an optical fiber cable, RF (radio frequency), or any suitable combination thereof.

In some embodiments, the client and server may use any currently known or future network protocol such as HTTP (HyperText Transfer Protocol) to communicate, and may be connected with digital data network in any form or medium (such as a communication network). Examples of communication networks include local area networks (LAN), wide area networks (WAN), the Internet (eg, the Internet), and peer-to-peer networks (such as ad hoc peer-to-peer networks), as well as any current or future network.

The above-mentioned computer-readable medium may be included in the above-mentioned electronic device, or may exist alone without being assembled into the electronic device.

The above-mentioned computer-readable medium carries one or more programs. The above-mentioned one or more programs, when being executed by the electronic device, cause the electronic device to: receive video images; recognize target objects in the video images; display, in response to a first target object being recognized, a first object having a first shape at a first location in the video images; display, in response to a second target object being recognized, a second object having a second shape at a second location in the video images; and combine, when a distance between the first target object and the second target object is less than a first threshold, the first object and the second object so that the first object and the second object form a third shape, where the third shape is formed by combining the first shape and the second shape.

Computer program code for performing operations of the present disclosure may be written in one or more programming languages, including but not limited to object-oriented programming languages, such as Java, Smalltalk, C++, and conventional procedural programming languages, such as the "C" language or similar programming languages. The program code may be executed entirely on a user computer, or partly on a user computer, or as a stand-alone software package, or partly on a user computer and partly on a remote computer, or entirely on a remote computer or server. In the case of using a remote computer, the remote computer may be connected to the user's computer through any kind of network, including a local area network (LAN) or a wide area network (WAN), or may be connected to an external computer (eg, using Internet connection provided by an Internet service provider).

The flowchart and block diagrams in the Figures illustrate the architecture, functionality, and operations of possible implementations of systems, methods and computer program products according to various embodiments of the present disclosure. In this regard, each block in the flowcharts or block diagrams may represent a module, program segment, or a portion of code that contains one or more executable instructions for implementing the specified logical functions. It should also be noted that, in some alternative implementations, the functions noted in the blocks may occur in an order other than the order shown in the figures. For example, two blocks shown in succession may be executed substantially concurrently, or the blocks may sometimes be executed in the reverse order, depending upon the functionality involved. It is also noted that each block of the block diagrams and/or flowchart illustrations, and combinations of blocks in the block diagrams and/or flowchart illustrations, may be implemented in dedicated hardware-based systems that perform the specified functions or operations, or may be implemented by a combination of dedicated hardware and computer instructions.

The units involved in the embodiments of the present disclosure may be implemented in a software manner, or in a hardware manner. The name of the unit does not constitute a limitation of the unit under any circumstances.

The functions described above may be performed, at least in part, by one or more hardware logic components. For example, without limitation, examples of hardware logic components that may be used include: a Field Programmable Gate Array (FPGA), a Application Specific Integrated Circuit (ASIC), an Application Specific Standard Product (ASSP), a System on Chip (SOC), a Complex Programmable Logical Device (CPLD) and the like.

In the present disclosure, a machine-readable medium may be a tangible medium that may contain or store a program for use by or in connection with the instruction execution system, apparatus or device. The machine-readable medium may be a machine-readable signal medium or a machine-readable storage medium. Machine-readable media may include, but are not limited to, electronic, magnetic, optical, electromagnetic, infrared, or semiconductor systems, devices, or devices, or any suitable combination thereof. More specific examples of machine-readable storage media include one or more wire-based electrical connections, portable computer disks, hard disks, random access memory (RAM), read only memory (ROM), erasable programmable read only memory (EPROM or flash memory), fiber optics, compact disk read only memory (CD-ROM), optical storage devices, magnetic storage devices, or any suitable combination thereof.

According to one or more embodiments of the present disclosure, an object display method is provided, including:
  receiving video images;
  recognizing target objects in the video images;
  displaying, in response to a first target object being recognized, a first object having a first shape at a first location in the video images;
  displaying, in response to a second target object being recognized, a second object having a second shape at a second location in the video images; and
  combining, when a distance between the first target object and the second target object is less than a first threshold, the first object and the second object so that the first object and the second object form a third shape, where the third shape is formed by combining the first shape and the second shape.

Further, the method further includes:
  controlling the first object and the second object to be disappear, when the distance between the first target object and the second target object is less than a second threshold; and
  displaying a first sequence of frames, where the first sequence of frames includes a third object having the third shape.

Further, the displaying, in response to a first target object being recognized, a first object having a first shape at a first location in the video images comprises:
  acquiring, in response to the first target object being recognized, a tracking point of the first target object;
  calculating the first location according to the tracking point of the first target object; and
  displaying the first object at the first location.

Further, the acquiring, in response to the first target object being recognized, a tracking point of the first target object includes:
  determining, in response to the first target object being recognized, a location of the first target object in the video images; and
  acquiring the tracking point of the first target object according to the location of the first target object in the video images.

Further, the displaying, in response to a second target object being recognized, a second object having a second shape at a second location in the video images includes:
  acquiring, in response to the second target object being recognized, a tracking point of the second target object;
  calculating the second location according to the tracking point of the second target object; and
  displaying the second object at the second location.

Further, the acquiring, in response to the second target object being recognized, a tracking point of the second target object includes:
  determining, in response to the second target object being recognized, a location of the second target object in the video images; and
  acquiring the tracking point of the second target object according to the location of the second target object in the video images.

Further, after the displaying, in response to a second target object being recognized, a second object having a second shape at a second location in the video images, the object display method further includes:
  calculating the distance between the first target object and the second target object;
  acquiring a change parameter of the first object and the second object according to the distance; and
  changing display states of the first object and the second object according to the change parameter.

According to one or more embodiments of the present disclosure, an object display apparatus is provided, including:
  an image receiving module, configured to receive video images;
  a target object recognition module, configured to recognize target objects in the video images;
  a first object display module, configured to display, in response to a first target object being recognized, a first object having a first shape at a first location in the video images;
  a second object display module, configured to display, in response to a second target object being recognized, a second object having a second shape at a second location in the video images; and
  a combining module, configured to combine, when a distance between the first target object and the second target object is less than a first threshold, the first object and the second object so that the first object and the second object form a third shape, where the third shape is formed by combining the first shape and the second shape.

Further, the object display device further includes:
  a disappear control module, configured to control the first object and the second object to be disappear when the distance between the first target object and the second target object is less than a second threshold; and
  a sequence frame display module, configured to display a first sequence frame, where the first sequence frame includes a third object having the third shape.

Further, the first object display module includes:
  a first tracking point acquiring module, configured to acquire, in response to the first target object being recognized, a tracking point of the first target object;
  a first location calculation module, configured to calculate the first location according to the tracking point of the first target object; and
  a first object display sub-module, configured to display the first object at the first location.

Further, the first tracking point acquiring module includes:
  a first target object location determining module, configured to determine, in response to the first target object being recognized, a location of the first target object in the video images; and a first tracking point acquiring sub-module, configured to acquire the tracking point of the first target object according to the location of the first target object in the video images.

Further, the second object display module includes:

a second tracking point acquiring module, configured to acquire, in response to the second target object being recognized, a tracking point of the second target object;

a second location calculation module, configured to calculate the second location according to the tracking point of the second target object; and a second object display sub-module, configured to display the second object at the second location.

Further, the second tracking point acquiring module includes:

a second target object location determining module, configured to determine, in response to the second target object being recognized, a location of the second target object in the video images; and a second tracking point acquiring sub-module, configured to acquire the tracking point of the second target object according to the location of the second target object in the video images.

Further, the object display device further includes:

a distance calculation module, configured to calculate the distance between the first target object and the second target object;

a change parameter acquisition module, configured to acquire a change parameter of the first object and the second object according to the distance; and a display state changing module, configured to change display states of the first object and the second object according to the change parameter.

According to one or more embodiments of the present disclosure, an electronic device is provided, including:

at least one processor, and a memory in communication connection with the at least one processor, where the memory stores instructions executable by the at least one processor, and the instructions, when being executed by the at least one processor, cause the at least one processor to perform any one of the above object display methods.

According to one or more embodiments of the present disclosure, a non-transitory computer-readable storage medium is provided, storing computer readable instructions used to cause a computer to perform any one of the above object display methods.

The above merely describes preferred embodiments of the present disclosure and illustrates the technical principles. Those skilled in the art should understand that the scope of the disclosure is not limited to the technical solutions formed by the specific combination of the above-mentioned technical features, and should also cover, without departing from the above disclosed concept, the technical solutions formed by any combination of the above-mentioned technical features or other equivalent features. For example, a technical solution may be formed by replacing a feature with another feature having similar function disclosed in the present disclosure (but not limited to).

The invention claimed is:

1. A computer-implemented method of generating special effects in video images, comprising:

receiving the video images;

recognizing target objects in the video images, wherein the target objects comprise a first target object and a second target object;

in response to recognizing the first target object in an image among the video images, displaying a first object corresponding to the first target object and having a first shape at a first location in the image;

in response to recognizing the second target object in the image, displaying a second object corresponding to the second target object and having a second shape at a second location in the image;

generating a third shape based on the first shape of the first object and the second shape of the second object in response to determining that a distance between the first target object and the second target object is less than a first threshold;

causing the first object and the second object to disappear in response to determining that the distance between the first target object and the second target object is less than a second threshold; and displaying a first sequence of frames at a location where the first object and the second object disappear, wherein the first sequence of frames presents a dynamic change process of a third object having the third shape.

2. The object display method according to claim 1, wherein the displaying, in response to a first target object being recognized, a first object corresponding to the first target object and having a first shape at a first location in the image comprises:

acquiring, in response to the first target object being recognized, a tracking point of the first target object;

calculating the first location according to the tracking point of the first target object; and displaying the first object at the first location.

3. The object display method according to claim 2, wherein the acquiring, in response to the first target object being recognized, a tracking point of the first target object comprises:

determining, in response to the first target object being recognized, a location of the first target object in the video images; and acquiring the tracking point of the first target object according to the location of the first target object in the video images.

4. The object display method of claim 1, wherein the displaying, in response to a second target object being recognized, a second object corresponding to the second target object and having a second shape at a second location in the image comprises:

acquiring, in response to the second target object being recognized, a tracking point of the second target object;

calculating the second location according to the tracking point of the second target object; and displaying the second object at the second location.

5. The object display method according to claim 4, wherein the acquiring, in response to the second target object being recognized, a tracking point of the second target object comprises:

determining, in response to the second target object being recognized, a location of the second target object in the video images; and acquiring the tracking point of the second target object according to the location of the second target object in the video images.

6. The object display method according to claim 1, wherein after the displaying, in response to a second target object being recognized, a second object corresponding to the second target object and having a second shape at a second location in the image, the object display method further comprises:

calculating the distance between the first target object and the second target object;

acquiring a change parameter of the first object and the second object according to the distance; and changing display states of the first object and the second object according to the change parameter.

7. An apparatus of generating special effects in video images, comprising:

at least one processor; and at least one memory communicatively coupled to the at least one processor and storing instructions that upon execution by the at least one processor cause the apparatus to:

receive the video images;

recognize target objects in the video images, wherein the target objects comprise a first target object and a second target object;

in response to recognizing the first target object in an image among the video images, display a first object corresponding to the first target object and having a first shape at a first location in the image;

in response to recognizing the second target object in the image, display a second object corresponding to the second target object and having a second shape at a second location in the image;

generate a third shape based on the first shape of the first object and the second shape of the second object in response to determining that a distance between the first target object and the second target object is less than a first threshold;

cause the first object and the second object to disappear in response to determining that the distance between the first target object and the second target object is less than a second threshold; and display a first sequence of frames at a location where the first object and the second object disappear, wherein the first sequence of frames presents a dynamic change process of a third object having the third shape.

8. The apparatus of claim 7, the at least one memory further storing instructions that upon execution by the at least one processor cause the apparatus to:

acquire, in response to the first target object being recognized, a tracking point of the first target object;

calculate the first location according to the tracking point of the first target object; and display the first object at the first location.

9. The apparatus of claim 8, the at least one memory further storing instructions that upon execution by the at least one processor cause the apparatus to:

determine, in response to the first target object being recognized, a location of the first target object in the video images; and acquire the tracking point of the first target object according to the location of the first target object in the video images.

10. The apparatus of claim 7, the at least one memory further storing instructions that upon execution by the at least one processor cause the apparatus to:

acquire, in response to the second target object being recognized, a tracking point of the second target object;

calculate the second location according to the tracking point of the second target object; and display the second object at the second location.

11. The apparatus of claim 10, the at least one memory further storing instructions that upon execution by the at least one processor cause the apparatus to:

determine, in response to the second target object being recognized, a location of the second target object in the video images; and acquire the tracking point of the second target object according to the location of the second target object in the video images.

12. The apparatus of claim 7, the at least one memory further storing instructions that upon execution by the at least one processor cause the apparatus to:

calculate the distance between the first target object and the second target object;

acquire a change parameter of the first object and the second object according to the distance; and change display states of the first object and the second object according to the change parameter.

13. A non-transitory computer-readable non-transitory storage medium, storing computer readable instructions, wherein the computer readable instructions, when being executed by a computer, cause the computer to:

receive video images;

recognize target objects in the video images, wherein the target objects comprise a first target object and a second target object;

in response to recognizing the first target object in an image among the video images, display a first object corresponding to the first target object and having a first shape at a first location in the image;

in response to recognizing the second target object in the image, display a second object corresponding to the second target object and having a second shape at a second location in the image;

generate a third shape based on the first shape of the first object and the second shape of the second object in response to determining that a distance between the first target object and the second target object is less than a first threshold;

cause the first object and the second object to disappear in response to determining that the distance between the first target object and the second target object is less than a second threshold; and display a first sequence of frames at a location where the first object and the second object disappear, wherein the first sequence of frames presents a dynamic change process of a third object having the third shape.

* * * * *